United States Patent [19]
Wood, II

[11] 3,883,844
[45] May 13, 1975

[54] SIGNAL MEANS FOR VEHICLE RETRACTABLE STEP

[76] Inventor: George F. Wood, II, 2842 E. 26th St., Tulsa, Okla. 74114

[22] Filed: Feb. 25, 1974

[21] Appl. No.: 445,360

[52] U.S. Cl............ 340/52 R; 340/272; 200/61.44; 200/86 R
[51] Int. Cl. .............................................. B60r 3/02
[58] Field of Search.......... 340/52 R, 272, 274, 278, 340/282; 200/61.44, 61.43, 61.42, 86.5, 86 R, 153 C, 61.7, 61.71, 61.72, 61.73, 61.74, 61.75

[56] References Cited
UNITED STATES PATENTS
932,018   8/1909   Herron..................... 340/272 UX Primary Examiner—Alvin H. Waring

[57] ABSTRACT

A remote signal means operably connected between a vehicle retractable step and the dashboard of the vehicle, or the area in the proximity of the operator of the vehicle, for providing a positive indication of the position of the step.

8 Claims, 4 Drawing Figures

PATENTED MAY 13 1975

3,883,844

3,883,844

SIGNAL MEANS FOR VEHICLE RETRACTABLE STEP

BACKGROUND OF THE INVENTION

1. Field of the Invention

This invention relates to improvements in vehicle steps and more particularly, but not by way of limitation, to a signal means for indicating the position of the step to the operator of the vehicle.

2. Description of the Prior Art

Many vehicles having doors somewhat remotely disposed from the operator of the vehicle are provided with auxiliary steps for facilitating entry or access to the interior of the vehicle through the door. For example, busses utilized for public transportation are frequently provided with auxiliary step means disposed exteriorly of the vehicle for facilitating entry of the passengers into the interior of the bus and discharge of the passengers therefrom. Such steps are often alternately retractable and extendable whereby the step may be extended when the vehicle is motionless for unloading or loading of passengers thereon, and retracted when the vehicle is in motion to avoid engagement of the step with other objects which might not only damage the step but also damage the engaged object.

Since these auxiliary steps are usually disposed exteriorly of the vehicle, the visual observance thereof by the operator of the vehicle is difficult, if not impossible. As a result, it is difficult for the operator of the vehicle to ascertain whether or not the retracting mechanism has functioned properly for fully retracting the step prior to the initiation of the movement of the vehicle. In addition, the operator of the vehicle may inadvertently start the motion of the vehicle without retracting the step. Of course, the disadvantages of a step on a moving vehicle which has inadvertently remained in the extended position will be apparent.

SUMMARY OF THE INVENTION

The present invention contemplates a signal device or apparatus operably connected between the vehicle retractable step and the area in the proximity of the operator of the vehicle. A suitable switching mechanism, such as a microswitch, mercury switch, or a mechanically actuated switching means, is installed on the step itself, or in the proximity thereof, and is so arranged whereby one position of the step will close the switch for completing the electrical circuit for activating the signal device, and another position of the step will open the switch for opening the electrical circuit for deactivating the signal device. Thus, when the step is in the extended position, a signal will be activated which is readily visible, or otherwise discernable by the operator of the vehicle. Conversely, when the step is in a retracted position, the signal will be deactivated, thus assuring the operator of the vehicle that the step has retracted properly. Of course, it is also preferable to provide an overriding switch, preferably in the proximity of the signal device, for deactivating the signal means at such times when it is desirable for the step to be extended without activation of the signal member. For example, if the vehicle is to be in a stationary position for an extended period of time, with the step extended for facilitating access to and from the interior of the vehicle, of for any other reason, it may be desirable to deactivate the signal member by opening of the override swithc means. The novel signal apparatus is simple and efficient in operation and economical and durable in construction.

DESCRIPTION OF THE PREFERRED EMBODIMENT

Figure 1:
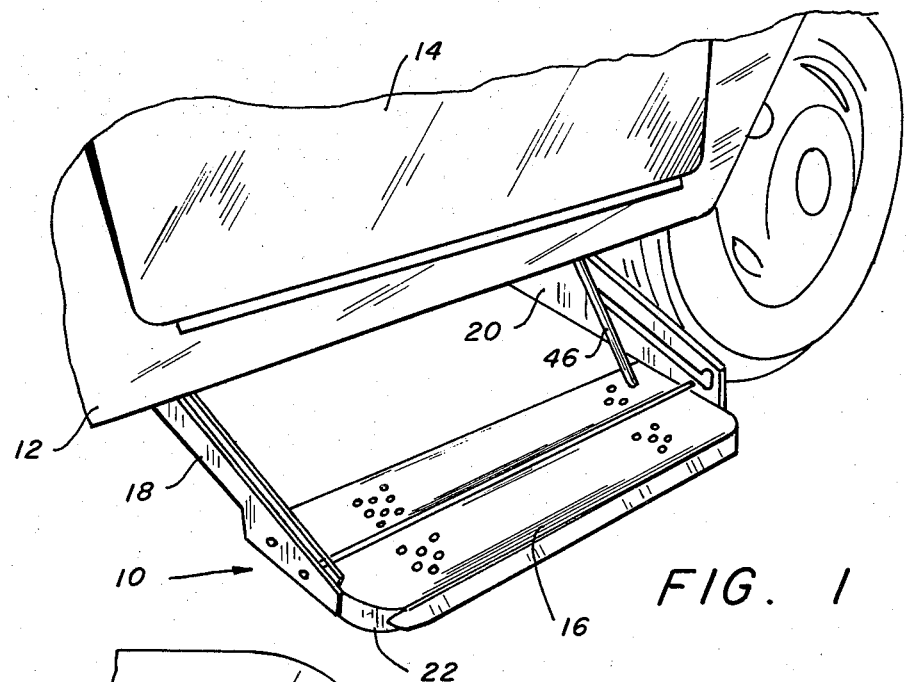
FIG. 1 is a perspective view of a retractable step as mounted on the exterior of a vehicle, with only a portion of the vehicle being depicted for purposes of illustration.

Referring to the drawings in detail, reference character 10 generally indicates an auxiliary step adapted to be secured to the exterior of a suitable vehicle 12 in the proximity of a door or opening 14 for facilitating the entry to and exiting from the interior of the vehicle 12, as is well known. The step 10 may be of any suitable type, preferably of a remote control type, and as shown herein is generally similar to the step structure disclosed in the A. W. McDonald U.S. Pat. No. 2,752,271, issued Sept. 16, 1958, and entitled "Foldable Steps for Trailers." The step 10 comprises a tread member 16 pivotally secured between a pair of spaced mutually parallel support brackets 18 and 20 in any suitable manner for pivoting about its own longitudinal axis.

The bracket members 18 and 20 are secured to the vehicle 12 in any suitable manner whereby the brackets 18 and 20 may be moved between alternate extended positions, as shown in FIG. 1, and retracted positions (not shown). In addition, the bracket members 18 and 20 are retractable and extendable in such a manner that retraction thereof rotates the tread member 16 in one direction about its longitudinal axis simultaneously with movement of the tread member 16 to a retracted position, preferably beneath and substantially adjacent the portion of the vehicle 12 below the door or opening 14. Conversely, extension of the bracket members 18 and 20 rotates the tread 16 about its longitudinal axis in an opposite direction simultaneously with the movement thereof to an extended position.

In the extended position of the step 10 as shown in FIG. 1, the longitudinal axis of the tread member 16 is disposed substantially horizontal and parallel wo and spaced from the surface of the ground (not shown), and the plane of the tread 16 is also disposed substantially parallel to the horizontal. In the retracted position of the step 10, the longitudinal axis of the tread 16 remains substantially horizontally disposed, but the plane of the tread 16, which has rotated about its longitudinal axis during the retracting thereof, is angularly disposed with respect to the horizontal. It is preferable that the rearward edge portion of the tread 16 be disposed at a lower position than the forward edge portion thereof, but it will be apparent that the forward edge portion may be disposed lower than the rearward portion, if desired.

Figure 2:
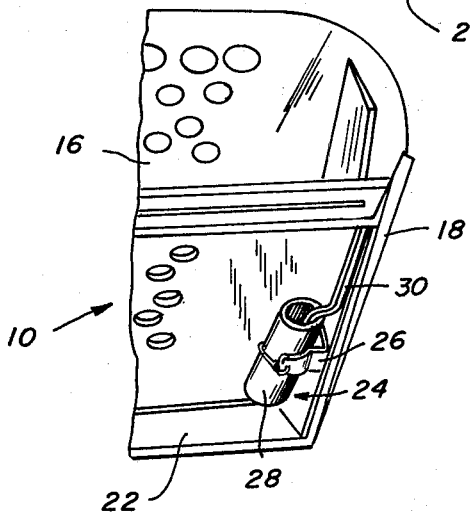
FIG. 2 is a perspective view of a portion of the under side of a retractable step and depicting a switch means embodying the invention secured to the step.
Figure 3:
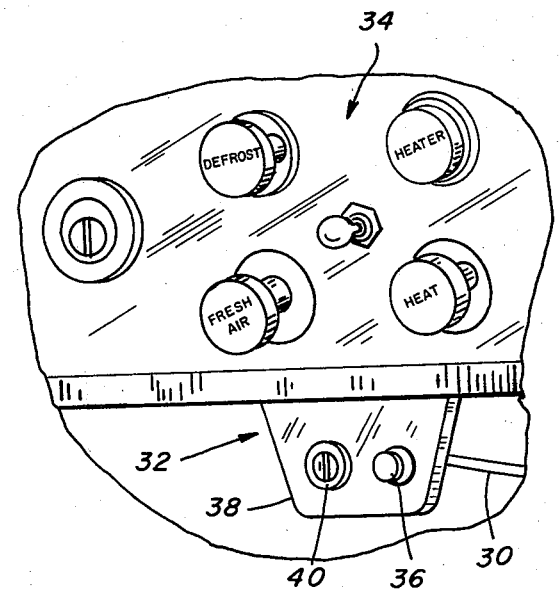
FIG. 3 is a perspective view of a portion of a vehicle dashboard illustrating a typical installation for a signal member as may be utilized in the invention.
Figure 4:
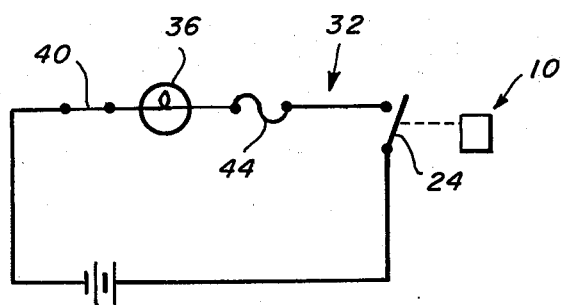
FIG. 4 is an electrical schematic view of a signal means embodying the invention.

As particularly shown in FIG. 2, the tread 16 is provided with a suitable support frame 22 on the lower or under surface thereof, which may be pivotally secured to the brackets 18 and 20 for securing the tread 16 thereto. A suitable switch member 24 is secured to the lower or under surface of the tread 16, or to the support frame 22, in any suitable manner, such as by a bracket 26. As shown herein, the switch 24 is a mercury switch comprising an outer cylindrical housing 28 for encasing a supply of mercury (not shown) therein. Suitable electrical conduit means 30 is electrically connected with the housing 28 whereby positioning of the housing 28 in a substantially horizontal position, or in a position wherein one end (such as the forward end thereof) is slightly lower than the opposite end thereof, will cause the mercury to move by gravity into engagement with the electrical connection for closing the switch 24 for a purpose as will be hereinafter set forth. Alternately, in a tilted position of the housing 28 whereby the rearward portion thereof is disposed below the forward portion thereof, gravity will cause the mercury to move rearwardly in the housing 28 and away from electrical contact with the electrical connection, thus opening the switch 24, as is well known in this type switch. Of course, suitable time-delay means may be provided for the energization of the switch 24, if desired.

It will be readily apparent that a mechanically actuated or operated switch may be provided in lieu of the mercury switch depicted herein, with the mechanically actuated switch being secured to the tread 16, or any other portion of the step 10 or vehicle 12, whereby the position of the trade 16 in an extended position will cause a physical or mechanical positioning of the mechanical switch for closing thereof, and the positioning of the tread 16 in a retracted position will cause a physical or mechanical positioning of the mechanical switch for opening thereof.

The electrical conduit 30 extends from the switch 24 to the interior of the vehicle 12 and into electrical connection with a suitable signal device 32 which may preferably be mounted on the dashboard 34 of the vehicle 12, or in substantially any desired area within the vehicle for accessibility to the operator of the vehicle. The signal device 32 as depicted herein comprises a lamp or bulb 36 in electrical connection with the switch 24 and mounted on a suitable plate 38 which is fastened to the dashboard 34 in any suitable manner (not shown). Of course, it will be apparent that the signal device 32 may include an audible signal means (not shown) in lieu of the visual lamp means, or both a visual and audible signal means, if desired. In addition, it is preferable to provide a suitable normally closed override switch 40 which may be mounted on the plate 38 and is in electrical communication with the lamp 36 for selective deactivation thereof for a purpose and in a manner as will be hereinafter set forth. Of course, an independent power source, such as a battery 42 may be provided for the signal device 32, or the power for the device 32 may be derived from the power supply or battery of the vehicle 12, as desired. It is also preferable to provide a suitable fuse 44 for the electrical circuit of the signal device 32, as is well known. It has also been found preferable to provide a suitable casing or sheath for receiving the electrical conduit 30 therethrough for protection thereof, and it may be convenient and preferable to direct the conduit 30 through a suitable tube member 46 (FIG. 1) secured to the step apparatus or assembly 10 for added protection of the cable or conduit 30 in the proximity of the step, particularly since the step 10 is movable between alternate extended and retracted positions.

In use, the signal device 32 may be installed on the step assembly 10, which may be a part of the vehicle 12. Of course, in the event the vehicle 12 is not provided with a step 10, a suitable step assembly may be installed therein in any well known manner. As hereinbefore set forth, the switch 24 may be secured directly to a portion of the tread 16, or may be mounted on some other portion of the step 10, or on the vehicle 12 in the proximity of the step assembly 10. In any event, the switch 24 is so mounted as to be closed when the step 10 is in the extended position thereof, and open when the step is in the retracted position thereof.

Assuming that the vehicle 12 is a bus, or the like, for public transportation, when the vehicle 12 is driven or moved into the proximity of a sidewalk area (not shown), or the like, for receiving or discharging passengers, the operator of the vehicle 12 may extend the step assembly 10 in the usual manner (not shown) for facilitating access to and departure from the interior of the vehicle. As soon as the step 10 is moved to its extended position, the switch 24 will be closed, whether it is a microswitch, mercury switch, or a mechanically activated type, or any other type, thus completing the electrical circuit of the signal device 32. The signal lamp 36 is then energized to provide a positive signal for the operator of the vehicle to indicate that the step 10 is in the extended position. This assures the operator of the vehicle 12 that the step 10 has been properly activated for facilitating the loading and unloading of passengers.

Subsequent to the loading and unloading of the passengers, the operator of the vehicle 12 may retract the step 10 in the usual manner prior to initiating the movement of the vehicle away from the passenger "pick-up" area. As hereinbefore set forth, the step 10 is normally remotely disposed with respect to the operator of the vehicle, and it is difficult, if not impossible, for the operator to visually ascertain whether or not the step 10 has been retracted. However, as long as the step 10 remains in the extended position, the signal lamp 36 (or other signal means) will remain activated, thus providing an indication to the operator that the step is in the extended position.

When the step assembly 10 has been actually retracted, the switch 24 will be open for interrupting the electrical circuit of the signal device 32, and deactivating the signal lamp 36. The operator of the vehicle 12 is thus advised that the step 10 has been retracted, and the vehicle may proceed to move away from the passenger "pick-up" zone, as desired.

Of course, there may be instances wherein the vehicle 12 is to be stopped for long periods of time with the step 10 in the extended position thereof. During such times, it may be undesirable for the signal lamp 36 to be activated. When this occurs, the override switch 40 may be opened for interrupting the electrical circuit of the signal device 32 and thus deactivating the signal lamp 36. When it is desired to reactivate the lamp 36, the overrids switch 40 may be returned to the normal closed position thereof.

From the foregoing it will be apparent that the present invention provides a novel signal means for retractable and extendable step assemblies provided on vehicles. The novel signal apparatus comprises switch means installed in such a relationship with the retractable step as to be closed upon extension of the step and opened upon retraction of the step. Closing of the switch means activates a signal means mounted in the interior of the vehicle and readily accessible by the operator of the vehicle, thus advising the operator of the vehicle of the extended position of the step. Opening of the switch means deactivates the signal means and provides an indication that the step assembly has been retracted. Of course, suitable override switch means may be provided for the signal device in order to selectively deactivate the signal means when it is undesirable for any reason for the signal to be continuously activated.

Whereas the present invention has been described in particular relation to the drawings attached hereto, it should be understood that other and further modifications, apart from those shown or suggested herein, may be made within the spirit and scope of this invention.

What is claimed is:

1. In combination with step means for vehicles, said step means being extendable and retractable between a passenger receiving position and a substantially concealed position, signalling apparatus comprising switch means operable by said step means for closing upon extension of the step means into said passenger receiving position and opening upon retraction of the step means into said concealed position, and a signal means operably connected with said switch means for activation upon closing of said switch means to provide indication of the extended position of the step means.

2. The combination as set forth in claim 1 and including override switch means operably connected with said signal means for selective deactivation thereof.

3. The combination as set forth in claim 1 wherein the switch means comprises mercury switch means secured to the step means and movable therewith to provide said closed position for the switch means in the extended position of the step means and to provide said open position for the switch means in the retracted position of the step means.

4. The combination as set forth in claim 1 wherein the step means includes tread means pivotal about its own longitudinal axis during extension and retraction of the step means, and said switch means includes microswitch means secured to said tread means for movement simultaneously therewith during said pivotal movement whereby said microswitch means is closed upon extension of the step means and open upon retraction of the step means.

5. The combination as set forth in claim 1 wherein the signal means comprises a lamp activated upon closing of the switch means to provide a visual indication within the vehicle of the extension position of the step means.

6. In combination with a vehicle retractable and extendable step means, signalling means for providing indication of the extended or retracted position of the step means, said signalling means comprising switch means operable to a closed position by the extension of said step means and operable to an open position by the retraction of said step means, a signal member disposed within the interior of the vehicle and operably connected with the switch means for activation upon closing of the switch means to provide an indication of the extended position of the step means and deactivated upon opening of the switch means to provide an indication of the retracted position of the step means, said switch means and signal member being operably connected with a power source for supply of electrical current thereto.

7. The combination as set forth in claim 6 wherein overriding switch means is operably connected with said signal member for selective deactivation thereof.

8. The combination as set forth in claim 6 wherein the switch means comprises a mercury switch, and the signal member comprises a lamp member.

\* \* \* \* \*